No. 773,893. PATENTED NOV. 1, 1904.
A. C. RALPH.
TROLLEY HARP.
APPLICATION FILED MAR. 11, 1904.
NO MODEL.
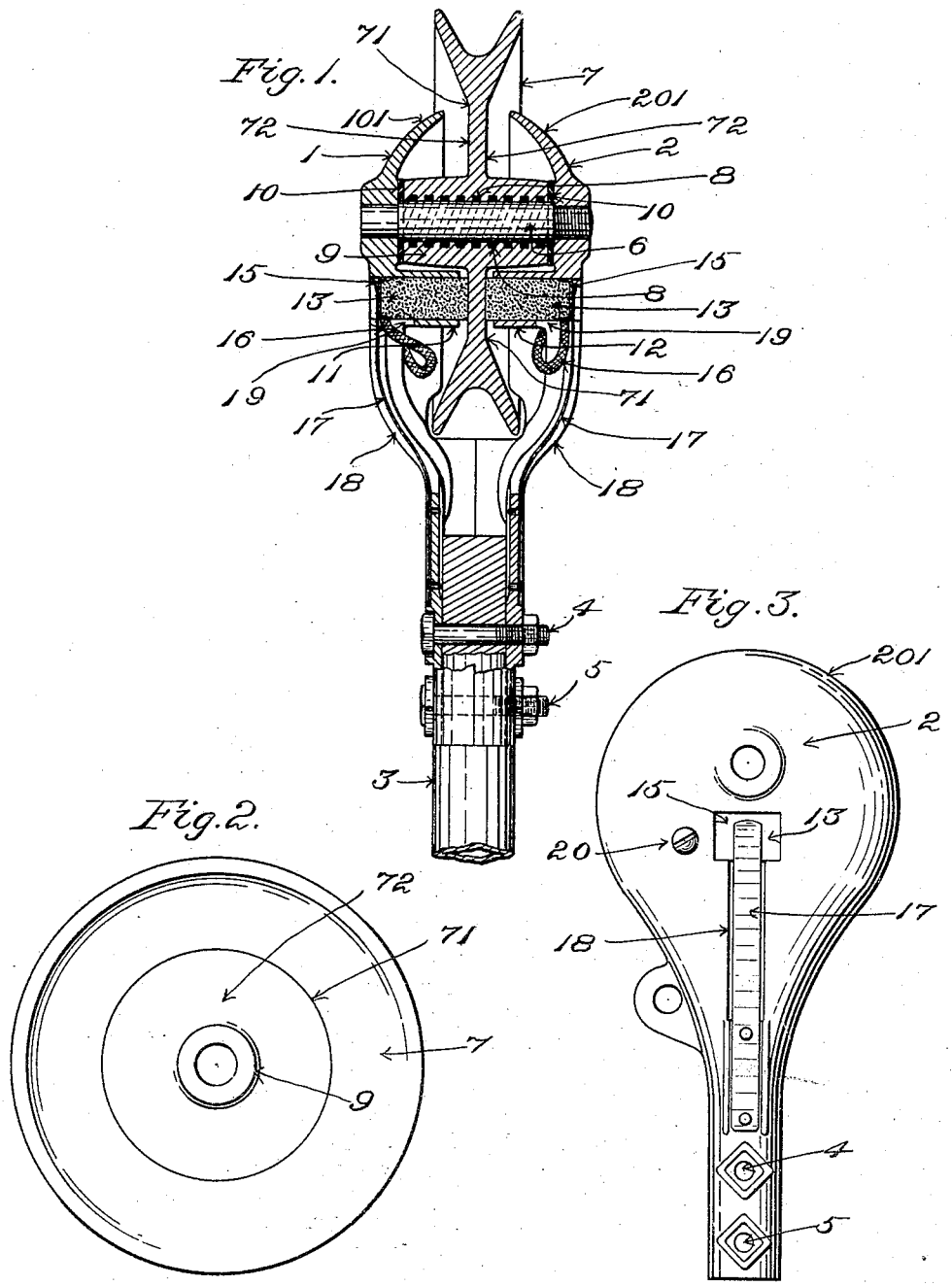
Witnesses:
J. Henry Parker
Oscar F. Hill
Inventor:
Alson C. Ralph
By MacLeod, Calver & Randall
Attorneys.

No. 773,893.

Patented November 1, 1904.

UNITED STATES PATENT OFFICE.

ALSON C. RALPH, OF SOMERVILLE, MASSACHUSETTS.

TROLLEY-HARP.

SPECIFICATION forming part of Letters Patent No. 773,893, dated November 1, 1904.

Application filed March 11, 1904. Serial No. 197,709. (No model.)

*To all whom it may concern:*

Be it known that I, ALSON C. RALPH, a citizen of the United States, residing at Somerville, in the county of Middlesex, State of Massachusetts, have invented a certain new and useful Improvement in Trolley-Harps, of which the following is a specification, reference being had therein to the accompanying drawings.

In the use of trolley-harps for use with systems employing a large current at a high potential it has been found that the trolley-wheel and its axle are rapidly destroyed by the passage of the current. This is due to the fact that the axle on which the trolley-wheel runs and which in the ordinary construction conveys the current from the wheel to the harp is made of steel or other metal having a comparatively low conductivity. The high resistance of the steel axle to the current rapidly causes the trolley-wheel and its axle to burn out, and as the trolley-wheel becomes loose upon the axle or the axle loose in the harp increased arcing arises from the wabbling of the wheel and the process of destruction goes on with increasing rapidity. It has been attempted to overcome these objections by the use of leaf-springs of some metal, as copper, having a high conductivity, said springs bearing against some portion of the wheel; but they have not been wholly successful, owing to the imperfect contact made at times between the end of the leaf-spring or brush and the wheel. This is particularly true when the current used is very heavy.

My invention has for its object to provide a suitable contact means which shall lead off to the trolley-harp the current received by the trolley-wheel without its passing through the axle and which shall maintain at all times a good contact with the trolley-wheel.

The invention will be readily understood from the following description, in which reference is made to the accompanying drawings, and the novel features thereof are pointed out and clearly defined in the claims at the close of this specification.

In the drawings, Figure 1 is a vertical section of a trolley-harp and trolley-wheel embodying my invention. Fig. 2 is a side view of the trolley-wheel which I employ with my improved device. Fig. 3 is a side elevation of one half of the trolley-harp.

Referring to Fig. 1, 1 and 2 are halves of a trolley-harp, which for convenience I make in two parts and which are attached to the trolley-pole 3 by the bolts 4 and 5. Rotating upon an axle 6 is the trolley-wheel 7. The axle 6 is fast at one end to one half, 1, of the harp and at the other end is screw-threaded for connection with the other half, 2, of the harp. As will be seen from the drawings, I make the parts of the two sides of the trolley-harp which project above the ends of the axle 6 of an inwardly-curving shape, as shown at 101 and 201. This causes the sides of the trolley-harp to fit closely about the trolley-wheel and prevents any possibility of the harp catching upon the trolley-wire or any part of the overhead construction and thereby doing damage. It also makes it possible for the operator to know that the groove of the trolley-wheel is in engagement with the trolley-wire and that the sides of the harp are not caught on the wire, as frequently happens in the dark when the operator cannot see the trolley-wire. I find this feature of my invention a very valuable one.

The trolley-wheel is provided with the usual V-shaped groove for connection with the trolley-wire and has spiral graphite bushings 8 to provide lubrication between the hub 9 of the wheel and its axle 6. At each end of the hub 9 I place pressed rawhide washers 10 to prevent lateral play of the trolley-wheel.

For use with my trolley-harp I employ a wheel having a solid web between the points 71 and the hub 9 in place of a wheel having spokes. This furnishes a flat bearing-surface 72 upon which brushes may press, as will be clear from Figs. 1 and 2. As a part of the two halves 1 and 2 of the trolley-harp I provide two guiding-casings 11 and 12 for the reception of brushes 13 or other suitable contact members. These brushes 13 I make, preferably, of pressed carbon having fastened to their outer ends casings 15 of copper or other suitable material of high conductivity, to which I attach flexible wires 16 made of braided copper wire or in any other suitable manner and capable of carrying a large current. The carbon brushes 13 are guided in the casings 11 and 12 and pressed inwardly against the smooth bearing-surface 72 of the trolley-wheel 7 by means of strong leaf-springs 17. These leaf-springs 17 lie in slots 18, cut through the sides of the trolley-harp, as seen in Fig. 3. The lower part of the brush-guiding casings 11 and 12 are also cut away, as shown in Fig. 1 at 19, in order that the leaf-spring 18 may follow the carbon brush 15 toward the bearing-surface 72 as the brush 13 wears away. The flexible lead-wires 16 above referred to are connected at one end to the copper coverings 15 of the carbon brushes and at their other end by screws 20 or other suitable means to the trolley-harp, thus forming electric connection between the brushes and the trolley-harp. As is to be seen from Fig. 1, the guiding-casings 11 and 12 and the carbon brushes 13 are so arranged that they do not project beyond the exterior of the sides 1 and 2 of the harp. By making the guiding-casings and the brushes contained therein in this form all danger of their coming in forcible contact with the span-wires or pole-arms is avoided, and they are thus protected from all liability to breakage.

In practice I make the bearing-surface 72 as close as possible to the hub 9 of the trolley-wheel. By this means the distance which the wheel travels in contact with the brush 13 is reduced to a minimum and the consequent wear upon the wheel and brushes due to friction between the parts. I find that this is a great advantage over any arrangement in which the contact means bears upon a portion of the wheel near its rim. It is thus evident that the current which is diverted from the trolley-wire by the trolley-wheel 7 passes through the carbon brushes 13, which are in contact with the bearing-surface 72 of the trolley-wheel, through the flexible lead-wires 16 to the sides 1 and 2 of the trolley-harp, and thence to the motor of the car. The brushes are at all times maintained in good electric contact with the moving trolley-wheel by means of the leaf-springs, and little or no current is required to pass through the axle 6, which may therefore be made of very hard steel or any other suitable metal without regard to its conductivity.

As the carbon brushes 13 gradually wear away by contact with the bearing-surface 72 of the trolley-wheel, there is produced no change in the contour of their bearing-surfaces and they still afford good electric contact. These carbon brushes may be easily renewed by new ones at little expense, and all danger of burning out of the axle or surrounding parts is avoided.

I claim as my invention—

1. In a harp for trolley-wheels, the combination of a trolley-wheel, a contact-brush, a trolley-harp having therein a casing to hold said brush, means whereby the said brush is held in contact with the said wheel and independent connecting means insuring electrical connection between the brush and the harp.

2. In a harp for trolley-wheels, the combination of a wheel, a casing in the harp for the reception of a brush, a brush therein, means maintaining said brush in contact with the wheel and flexible electric connections beween the said brush and the said trolley-harp.

3. In a harp for trolley-wheels, the combination of a wheel having a flat bearing-surface between the hub and the rim, a brush for contact therewith, guiding means in the side of the said trolley-harp, a spring maintaining the said carbon brush in contact with the said bearing-surface and flexible electric connecting means between the said brush and the sides of the trolley-harp.

4. In a two-part trolley-harp for trolley-wheels, the combination of a trolley-wheel having a flat bearing-surface between the hub and the rim, an axle fast to one half of the trolley-harp, contact means as a carbon brush bearing upon the said bearing portion, guiding means therefor in the said trolley-harp, a spring maintaining the said brush in contact with the trolley-wheel, and flexible electric connecting means between the brush and the harp.

5. In a trolley-harp, the combination with a wheel, of a casing in the side of the harp, a brush in said casing adapted to bear on the side of the wheel, and means for maintaining said brush in contact with the wheel, said casing and brush lying wholly within the exterior surface of the harp.

6. In a trolley-harp, the combination with a wheel, of a harp member having an open-ended integral casing projecting inwardly from the side of the harp, a brush in said casing, and means for holding said brush normally in contact with the wheel, said casing and brush lying wholly within the exterior surface of the harp.

7. In a trolley-harp, the combination with a wheel, of a harp member having a brush-receiving aperture and a spring-containing slot in its side, a brush-receiving casing projecting inwardly from said brush-receiving aperture, a brush in said casing, and a spring to hold said brush normally in contact with said wheel, said casing, brush, and spring lying wholly within the exterior surface of the harp.

In testimony whereof I affix my signature in presence of two witnesses.

ALSON C. RALPH.

Witnesses:
 GEORGE P. DIKE,
 WILLIAM A. COPELAND,